United States Patent
Huang et al.

(10) Patent No.: US 6,688,572 B2
(45) Date of Patent: Feb. 10, 2004

(54) PLANE DISPLAY WITH FOLDABLE SUPPORT

(75) Inventors: Shih-Chun Huang, Taipei (TW); Wen-Pin Lin, Jungli (TW)

(73) Assignee: Quanta Computer, Inc., Taoyuan (TW)

( * ) Notice: Subject to any disclaimer, the term of this patent is extended or adjusted under 35 U.S.C. 154(b) by 0 days.

(21) Appl. No.: 10/294,922

(22) Filed: Nov. 14, 2002

(65) Prior Publication Data
US 2003/0197099 A1 Oct. 23, 2003

(30) Foreign Application Priority Data
Apr. 18, 2002 (TW) .................................. 91205211 U

(51) Int. Cl.⁷ ............................................. E04G 3/00
(52) U.S. Cl. ..................... 248/291.1; 16/328; 16/340; 248/292.14; 248/919
(58) Field of Search ............................... 248/917, 918, 248/919, 920, 921, 922, 923, 291.1, 292.13, 298.1, 371, 372.1, 122.1; 16/327, 328, 319, 326, 345, 352, 353; 361/683, 681

(56) References Cited

U.S. PATENT DOCUMENTS

| | | | | |
|---|---|---|---|---|
| 5,697,124 A | * | 12/1997 | Jung | 16/341 |
| 5,751,548 A | * | 5/1998 | Hall et al. | 361/686 |
| 5,894,633 A | * | 4/1999 | Kaneko | 16/306 |
| 5,996,178 A | * | 12/1999 | Murray | 16/303 |
| 6,018,847 A | * | 2/2000 | Lu | 16/337 |
| 6,034,867 A | * | 3/2000 | Seo | 361/683 |
| 6,108,868 A | * | 8/2000 | Lin | 16/340 |
| 6,115,886 A | * | 9/2000 | Fujita | 16/330 |
| 6,378,830 B1 | * | 4/2002 | Lu | 248/278.1 |
| 6,459,887 B2 | * | 10/2002 | Okuda | 455/90.1 |
| 6,502,792 B1 | * | 1/2003 | Cho et al. | 248/121 |
| 6,512,670 B1 | * | 1/2003 | Boehme et al. | 361/681 |
| 6,581,893 B1 | * | 6/2003 | Lu | 248/291.1 |

* cited by examiner

*Primary Examiner*—Ramon O. Ramirez
*Assistant Examiner*—Tan Le

(57) ABSTRACT

A plane display with foldable support. The plane display comprises a base and a back plate mounted on a plane display panel. The back plate pivots onto the base through a bolt. The back plate has a fixing piece and a first arm. An operating rod movably connected to the fixing piece and the first arm slides between a first position and a second position. When the operating rod is in the first position, the back plate is fixed to the base at a first angle. When the operating rod is located in the second position, the operating rod releases the back plate from the base, such that the back plate rotates with respect to the base to a second angle.

10 Claims, 7 Drawing Sheets

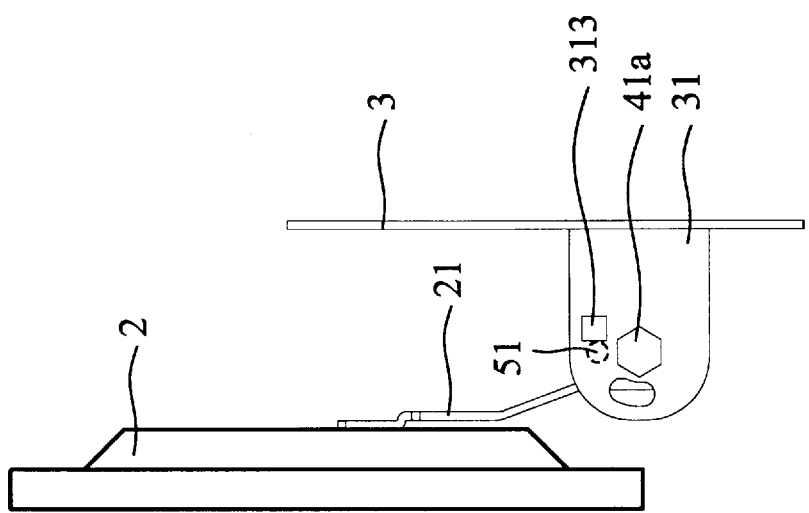
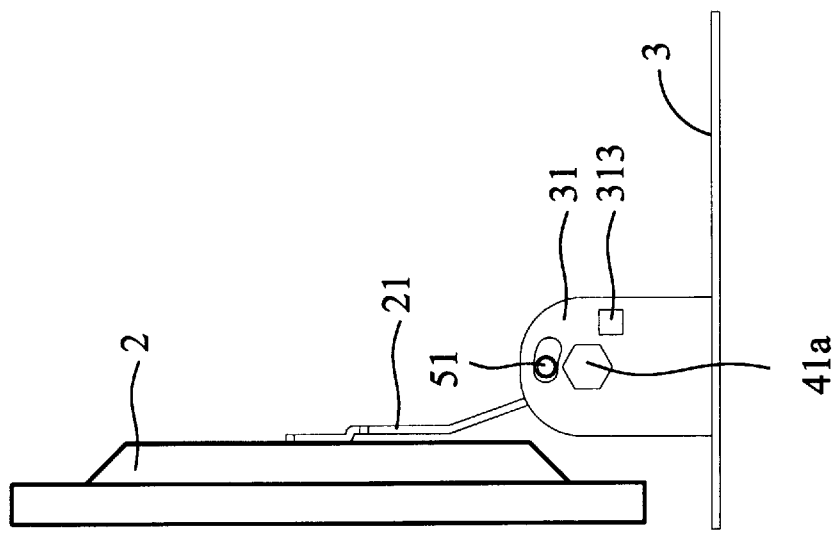
FIG. 7B
FIG. 7A

PLANE DISPLAY WITH FOLDABLE SUPPORT

BACKGROUND OF THE INVENTION

1. Field of the Invention

The present invention relates to a plane display, and more particularly, to a plane display with foldable support.

2. Description of the Related Art

Liquid crystal displays (LCD) are popular plane displays. Compared to cathode ray tube displays (CRT), LCDs have advantages of lower radiation, lower power consumption and smaller profile. FIG. 1 is a schematic side view of a conventional LCD, including an LCD panel 11, a connecting hinge 13, an arm 15 and a base 17. The LCD panel 11 is connected to a computer through. The LCD panel 11 is rotatably connected to the arm 15 extending from the base 14 by the shaft 13. Thus, users can change the vertical position and the observation angle of the LCD panel 11.

The profiles of plane displays, such as LCDs, are smaller than conventional CRT displays. Plane displays, however, usually have large and wide bases with weights to keep balance and protect them from falling. Plane displays with large bases, however, require large packing boxes and use more space. Thus, the average traffic expense per unit is raised.

SUMMARY OF THE INVENTION

The object of the present invention is to provide a foldable support for a plane display. Before packing the plane display, the support can be folded to reduce packing space and traffic expense per unit.

The present invention provides a plane display with foldable support. The plane display comprises a base and a back plate mounted on a plane display panel. The back plate pivots on the base through a shaft. The back plate has a fixing piece and a first arm. An operating rod movably connected to the fixing piece and the first arm slides between a first position and a second position. When the operating rod is in the first position, the back plate is fixed to the base at a first angle. When the operating rod is located in the second position, the operating rod releases the back plate from the base, such that the back plate rotates with respect to the base to a second angle.

In the above-mentioned foldable support, the operating rod has a flange. When the operating rod is in the first position, the flange contacts the fixing piece.

In the above-mentioned foldable support, a spring is disposed on the operating rod to keep the operating rod in the first position.

In the above-mentioned foldable support, the first arm has a first hole. A first fin has a second hole. When the operating rod is in the first position, the operating rod is disposed through the first hole and the second hole and secures the back plate at the first angle with respect to the base.

In the above-mentioned foldable support, when the operating rod is located in the second position, the operating rod exits the second hole. The back plate rotates with respect to the base to the second angle.

A detailed description is given in the following embodiments with reference to the accompanying drawings.

BRIEF DESCRIPTION OF THE DRAWINGS

The following detailed description, given by way of example and not intended to limit the invention solely to the embodiments described herein, will best be understood in conjunction with the accompanying drawings, in which:

FIG. 7A is a schematic side view of a plane display with the support in FIG. 2 extended; and FIG. 7B is a schematic side view of a plane display with the support in FIG. 2 folded.

DETAILED DESCRIPTION OF THE INVENTION

Figure 1:
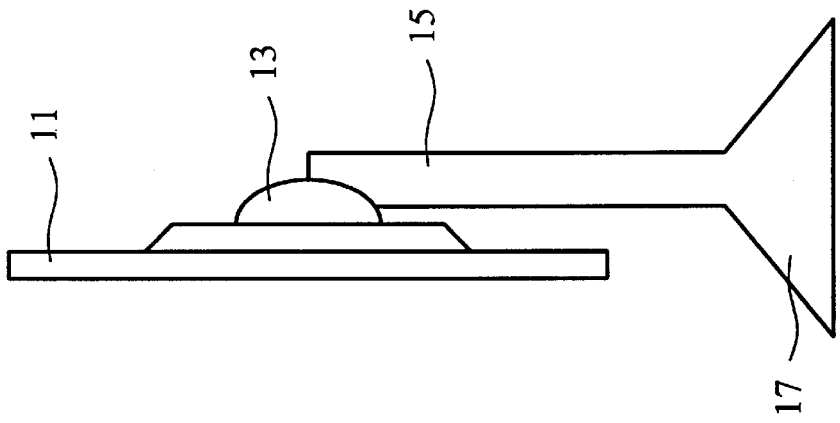
FIG. 1 is a schematic side view of a conventional plane display as referenced in the Prior Art.
Figure 2:
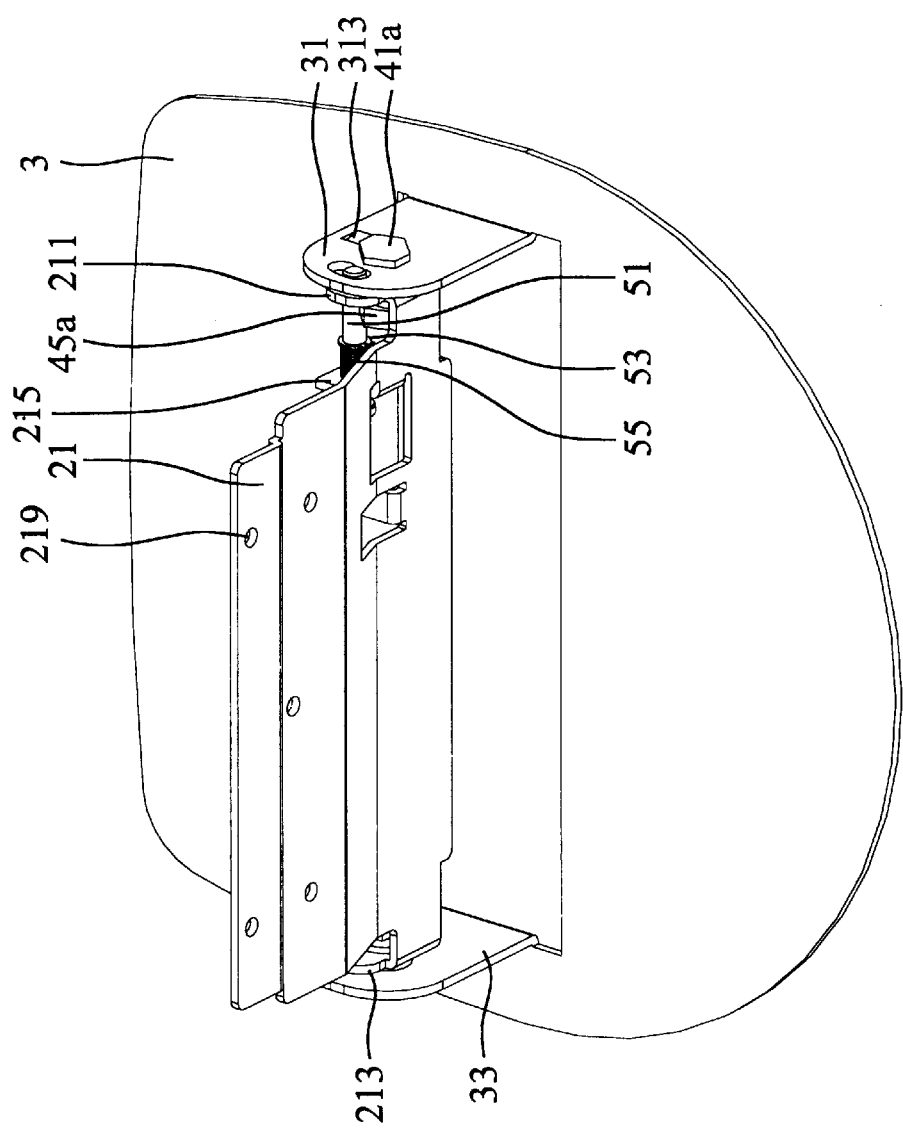
FIG. 2 is a perspective view of the foldable support of the invention.

FIG. 2 is a perspective view of the foldable support of the invention. In FIG. 2, the foldable support for a plane display of the invention includes a base 3 and a back plate 21. The back plate 21 has a plurality of bolt holes 219 to mount the plane display panel (not shown). The back plate 21 has a first arm 211 and a second arm 213 respectively pivoting on a first fin 31 and a second fin 33 of the base 3. Thus, the back plate 21 can be rotated with respect to the base 3.

Figure 3:
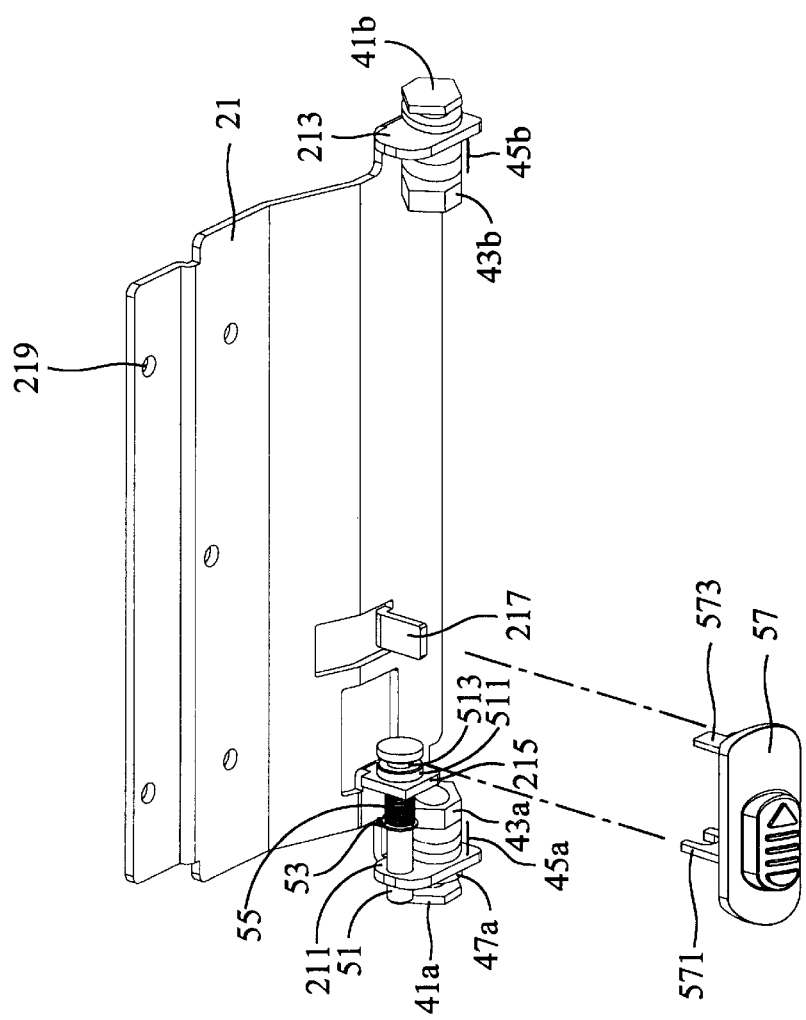
FIG. 3 is an enlarged perspective view of the back plate in FIG. 2.
Figure 4:
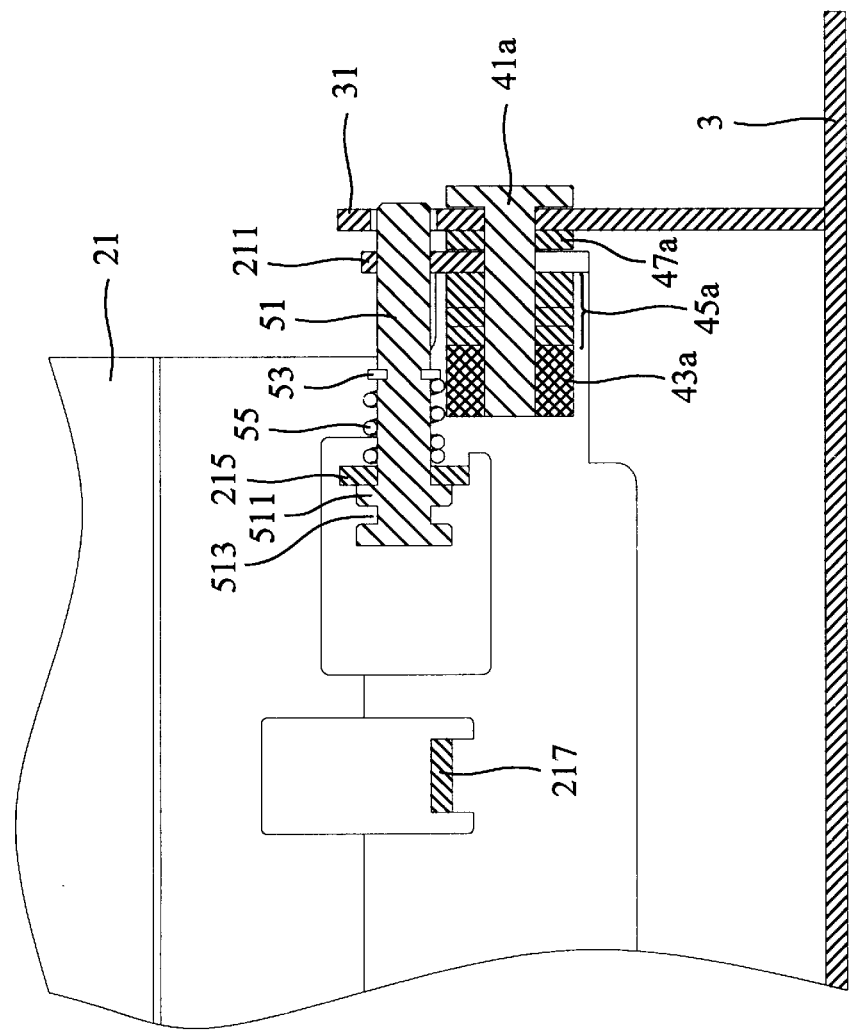
FIG. 4 is a partially enlarged cross-section of the foldable support in FIG. 2.
Figure 5:
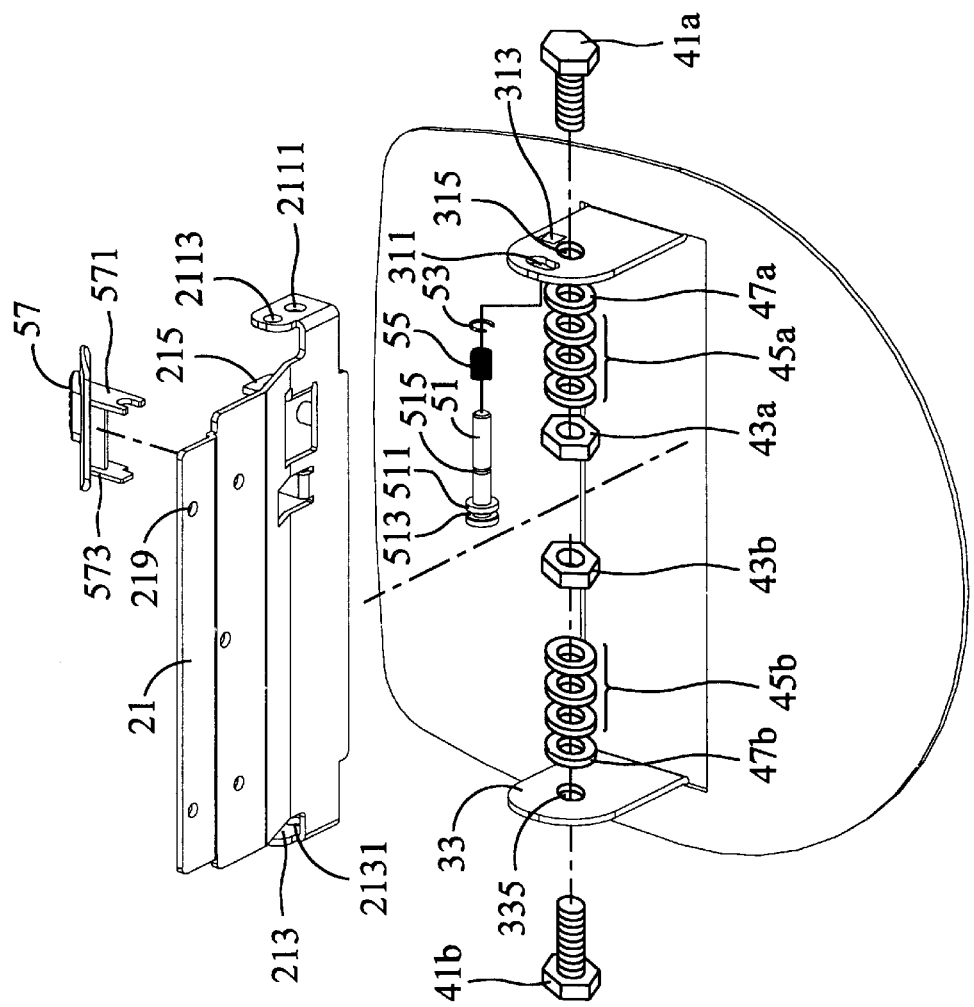
FIG. 5 is an exploded view of the foldable support of the invention.

In FIGS. 3, 4 and 5, the first arm 211 of the back plate 21 pivots on the fist fin 31 of the base 3 by a bolt 41a and a nut 43a. The second arm 213 of the back plate 21 pivots on the second fin 33 of the base 3 by a bolt 41b and a nut 43b. Furthermore, spacers 47a, 47b are alternatively disposed on the bolts 47a, 47b to maintain intervals between the first arm 211 and the first fin 31, and between the second arm 213 and the second fin 33. The spacers 45a, 45b of both sides provides friction for the bolts 41a, 41b.

An operating rod 51 movably disposed between a fixing piece 215 and the first arm 211 of the back plate 21. The operating rod 51 has two flanges at the same end, and there is a groove 513 formed between these two flanges. The operating rod 51 passes through the hole of the fixing piece 215, and the flange 511 keeps the operating rod 51 from falling. A C-shaped buckle 53 is engaged on the operating rod 51, between the first arm 211 and the first fin 31. A spring 55 is disposed between the C-shaped buckle 53 and the first arm 211 such that the spring 55 provides an elastic force to keep the flange 511 contacting the fixing piece 215, and the end of the operating rod 51 extending through the track 311 of the first fin 31. Because the end of the operating rod 51 passes through the track 311 of the first fin 31, the back plate 21 is fixed to the base 3 at the first angle. Moreover, a button 57 is fixed on the operating rod 51 and engages with the groove 513. When pushing the button 57, the end of the operating rod 51 exits the track 311 of the first fin 31. The back plate 21 can be rotated with respect to the base 3.

The track 311 of the first fin 31 is an arched slit limiting the end of the operating rod 51 to a predetermined range. Thus, the included angle between the back plate 21 and the base 3 can be adjusted within the predetermined range. As well, the observation angle of the plane display panel (not shown) can be changed.

Referring to FIG. 5, when assembling the foldable support, the bolt 41a is disposed through the hole 315 of the first fin 31, the spacer 47a, the hole 2111 of the first arm 211 and the spacers 45a, and fastened by the nut 43a. On the other side of the back plate 21, the bolt 41b is disposed through the hole 335 of the second fin 33, the spacer 47b, the hole 2131 of the second arm 213 and the spacers 45b, and fastened by the nut 43b. The friction for changing the inclined angle of the back plate 21 can be adjusted by adjusting the bolts 41a, 41b.

In FIGS. 4 and 5, the operating rod 51 is disposed through the hole of the fixing piece 215, the spring 55 secured by the C-shaped buckle 53 and the track 311 of the first fin 31. When the end of the operating rod 51 exits the track 311 of the first fin 31, the spring 55 provides an elastic force for the operating rod 51 to return to the original position at which the flange 511 of the operating rod 51 contacts the fixing piece 215. Finally, the clip portion 571 of the button 57 engages with the groove 513 of the operating rod 51, and the extending portion 573 of the button 57 slides along the supporting piece 217. Thus, the assembly progress is finished.

Figure 6:
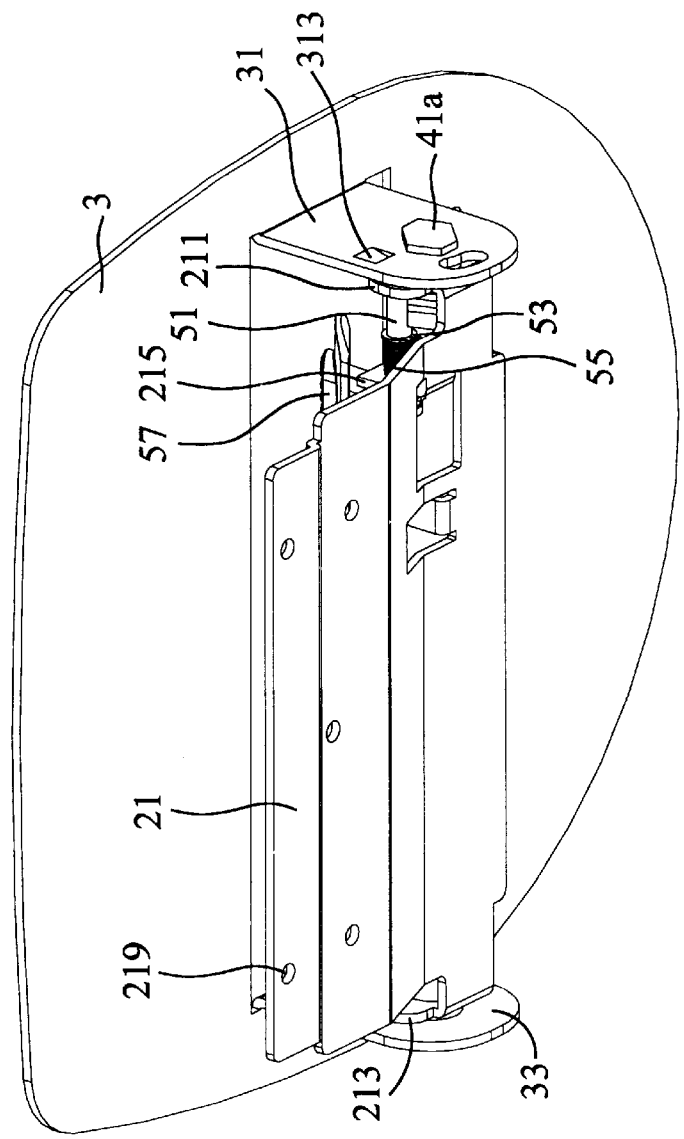
FIG. 6 is a perspective view of the support folded.

Referring to FIGS. 2 and 3, when folding the foldable support of the invention, the button 57 is pushed. The operating rod 51 moves rightward and drives the end of the operating rod 51, to exit the track 311 of the first fin 31. Therefore, the back plate 21 can be rotated with respect to the base 3 to the position shown in FIG. 6.

FIG. 7A is a schematic side view of a plane display with the support extended, and FIG. 7B is a schematic side view of a plane display with the support in FIG. 2 folded. In FIGS. 7A and 7B, the foldable support of the invention is suitable for a plane display panel 2, such as a LCD panel or a plasma display panel (PDP). When using the plane display, the observation angle can be adjusted within a predetermined range. At the same time, the base 3 uses a large space. When packing the plane display, the button 57 (FIG. 3) is simply pushed, and the base 3 can be rotated until the operating rod 51 is blocked by a stopper of the first fin. The base is folded to the position behind the plane display panel 2, shown in FIG. 7B. Accordingly, the plane display uses less space and is easily stored.

Furthermore, a smaller box can contain the plane display with the foldable support folded. The manufacturer can reduce the traffic expense per unit of the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A foldable support for a plane display panel, comprising:

a base having a first fin;

a bolt;

a back plate having a first arm and a fixing piece, mounted on the plane display panel and pivoting on the first fin through the bolt to rotate with respect to the base; and a rod, movably connected to the fixing piece and the first arm and sliding between a first position and a second position, wherein the back plate is fixed to the base at a first angle when the operating rod is in the first position, and the operating rod releases the back plate from the base when the operating rod is in the second position, such that the back plate rotates with respect to the base to a second angle.

2. The foldable support as claimed in claim 1, wherein the operating rod has a flange, such that when the operating rod is in the first position, the flange contacts the fixing piece.

3. The foldable support as claimed in claim 1, wherein a spring is disposed on the operating rod to keep the operating rod in the first position.

4. The foldable support as claimed in claim 1, wherein the first arm has a first hole, the first fin has a second hole, and when the operating rod is in the first position, the operating rod is disposed through the first hole and the second hole and secures the back plate at the first angle with respect to the base.

5. The foldable support as claimed in claim 4, wherein when the operating rod is located in the second position, the operating rod exits the second hole, and the back plate rotates with respect to the base to the second angle.

6. A plane display, comprising:

a plane display panel;

a base having a first fin;

a bolt;

a back plate having a first arm and a fixing piece, mounted on the plane display panel and pivoting on the first fin through the bolt to rotate with respect to the base; and an operating rod, movably connected to the fixing piece and the first arm and sliding between a first position and a second position, wherein the back plate is fixed to the base at a first angle when the operating rod is in the first position, and the operating rod releases the back plate from the base when the operating rod is in the second position, such that the back plate rotates the respect to the base to a second angle.

7. The foldable support as claimed in claim 1, wherein the operating rod has a flange, such that when the operating rod is in the first position, the flange contacts the fixing piece.

8. The foldable support as claimed in claim 6, wherein a spring is disposed on the operating rod to keep the operating rod in the first position.

9. The foldable support as claimed in claim 6, wherein the first arm has a first hole, the first fin has a second hole, and when the operating rod is in the first position, the operating rod is disposed through the first hole and the second hole and secures the back plate at the first angle with respect to the base.

10. The foldable support as claimed in claim 9, wherein when the operating rod is located in the second position, the operating rod exits the second hole, and the back plate rotates with respect to the base to the second angle.

* * * * *